J. G. CAPSTAFF.
METHOD OF AND ARTICLE FOR MAKING PHOTOGRAPHS.
APPLICATION FILED JAN. 6, 1917.

1,273,457.

Patented July 23, 1918.

Witnesses

INVENTOR
John G. Capstaff
BY
his ATTORNEYS

UNITED STATES PATENT OFFICE.

JOHN G. CAPSTAFF, OF ROCHESTER, NEW YORK, ASSIGNOR TO EASTMAN KODAK COMPANY, OF ROCHESTER, NEW YORK, A CORPORATION OF NEW YORK.

METHOD OF AND ARTICLE FOR MAKING PHOTOGRAPHS.

1,273,457.   Specification of Letters Patent.   Patented July 23, 1918.

Application filed January 6, 1917. Serial No. 140,887.

*To all whom it may concern:*

Be it known that I, JOHN G. CAPSTAFF, of Rochester, in the county of Monroe and State of New York, have invented certain new and useful Improvements in Methods of and Articles for Making Photographs; and I do hereby declare the following to be a full, clear, and exact description of the same, reference being had to the accompanying drawings, forming a part of this specification, and to the reference-numerals marked thereon.

My present invention relates to photography and has for one of its objects to provide a method and means whereby either of two sensitive bodies that are to photographically record, independently, separate images, may be exposed in the presence of the other without allowing the light that exposes one sensitive body to affect the other. The invention may be used to advantage in the making of photographic reproductions of the transparency type in which the natural colors are reproduced or approximated by a process of the nature described in my prior Patent No. 1,196,080, dated August 29, 1916. The improvements are particularly applicable to the operation of independently exposing the two sensitive bodies of a double coated film such as is used in making colored motion picture strips, though they may also be utilized to advantage in the separate taking of pictures of color sensation records for use with a process of the kind referred to, to prevent halation. To these and other ends the invention resides in certain improvements and combinations of parts all as will be hereinafter more fully described, the novel features being pointed out in the claims at the end of the specification.

In the drawings.

Similar reference numerals in the several figures indicate the same parts.

Figure 1:
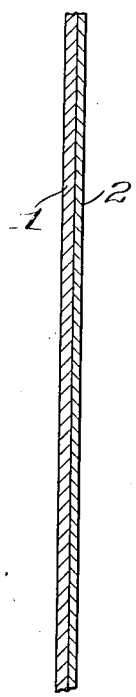
Figures 1 and 2 are sectional views through a film support and screen illustrative of successive operations in one form of my process.

To first state generally what is accomplished in carrying out my invention in one of its embodiments, I may say that it has heretofore been a problem to independently expose two films or sensitive bodies on opposite sides of a double coated transparent film base and to prevent the light to which one film is subjected from passing through and deleteriously affecting the other, the purpose being, in the case of color photography, to obtain registering images of the same subject representing different color values thereof and which may carry complementary colors that will jointly give the true color effects of the subject when viewed by transmitted light. I propose separating the two sensitive bodies by an intervening opaque or light resisting screen of such a nature that its opacity will be destroyed and that it will be rendered transparent, or neutral, in a simple and efficacious manner, and, in the case of the color process referred to, by reason of a treatment to which the said bodies are necessarily subjected at a later stage in the development of the picture so that the eradication of the screen is automatic and requires no separate or additional individual treatment.

To first briefly describe the process of my said prior patent in connection with which the present invention may be utilized, I prepare two negatives of the subject on panchromatic silver bromo-iodid gelatin films under the same conditions except that one negative is made mainly by the green light reflected by the subject and the other mainly by the red light through the use of red and green ray filters. After developing and washing the two negatives as usual, they are submitted to a bleaching and tanning bath which converts the free silver into a salt of silver that is subsequently removed, leaving the films practically clear. The bath suggested is equal parts of A and B as follows:

A. Potassium ferricyanid _____ 37.5 gms.
  "   bromid _____ 56.25 "
  "   bichromate _____ 37.5 "
 Acetic (or similar) acid _____ 10 cc.
 Water _____ 1,000 cc.
B. Potassium alum _____ 5%

Aside from the conversion of the silver, peculiar chemical reactions that set in have the effect of tanning or hardening the gelatin in the immediate neighborhood of each silver particle attacked so that what were the black portions of the original negative film are rendered substantially impenetrable to the dye that is next applied, substantially in proportion to the amount of silver originally present, while what were the light portions of the original negative that lack the free silver remain unchanged or relatively soft and receptive to the coloring matter. As the two negatives record different color sensations they constitute complements of each other in the matter of the distribution of silver particles and consequently, when they are respectively immersed in red and green dye baths, the soft or untanned portions of each take up their dyes in a complementary manner and when superposed in exact register and viewed with transmitted light, a proper distribution of color in the whole subject is the result. The red portions have been dyed in the red component only, the corresponding portions of the green component being clear; the green portions have been dyed in the green component only, the corresponding portions of the red component being clear; the dark portions have been dyed in both and neutralize each other, and the light portions have been dyed in neither and remain clear.

Figure 2:
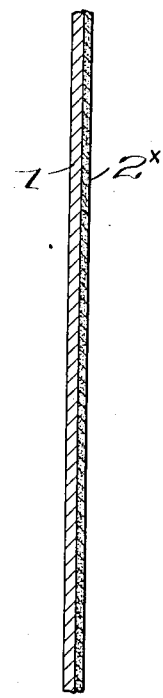

As it is sometimes convenient to effect the register of the two component images at the time of taking or of printing them and to treat them as above while in that relationship, the beforementioned purpose of my present invention will now be understood. This sequence of operation is particularly applicable to the preparation of motion picture film and referring to the drawings, in the practice of my invention, I may first prepare the usual transparent celluloid film base or strip 1 (Fig. 1) with a gelatin emulsion 2 containing sensitive silver salts and expose it thoroughly and uniformly to light and develop and wash it so that the sensitive silver salt is reduced to free silver distributed in minute particles throughout as represented at 2ˣ in Fig. 2. I prefer, however, to produce the element 2ˣ by preparing an emulsion in which the silver particles of the nature mentioned are present in the free state in the mass and then to coat the film base with this preparation so that the necessity of subjecting the film to further treatment for the reduction of the silver is obviated and the step illustrated by Fig. 1 is omitted. The presence of this silver renders the layer light resisting and substantially opaque though it need not be absolutely so in most instances and the emulsion should be selected with a view toward rendering the screen thus produced of a very fine grain. I then apply the two sensitive layers or coatings 3 and 4 of gelatin emulsion that are to bear the respective color sensation records and to be exposed from opposite sides of the strip and it is pointed out in passing that these sensitive bodies are not always panchromatic as in the manufacture of motion picture strips, they are more frequently printed from black and white positives and the duplicate negatives converted into dye positives as has been explained.

It will at once be apparent that with the sensitive layer 3 applied to one face of the base or support 1 and the other layer 4 applied to the screen 2ˣ on the opposite face, they are separated and light sealed from each other by the intervening screen 2ˣ and hence their exposure can be conducted independently without interference of the one operation with the other. It will furthermore be apparent that the opacity of the screen 2ˣ must be entirely destroyed to produce the transparency of the finished product. But because of the nature of the screen 2ˣ, it responds to the same treatment as do the silver portions in the bodies 3 and 4 after exposure and therefore during the bleaching process, the free silver in the screen 2ˣ is eliminated entirely and as it is evenly distributed and present in quantity, the remaining gelatin of the screen becomes clear and uniformly hard or dye resisting. It is therefore indifferent to both the red and the green dye and is not changed in the dyeing operation. It consequently does not materially affect either the transparency or the coloring of the finished picture and remains a neutral or passive element of the laminated structure as does the support 1 itself. It will be seen that the screen therefore requires no special treatment but is automatically eliminated following the period of its usefulness by the agencies necessarily brought forward in creating the color components themselves.

Figure 3:
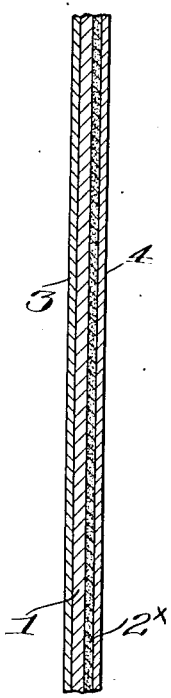
Fig. 3 is a similar view of the complete article embodying my invention as used in carrying out the process.
Figure 4:
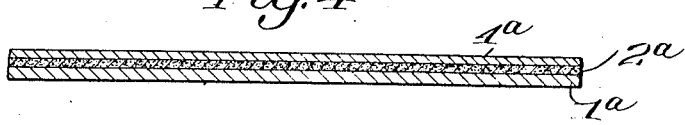
Fig. 4 is a sectional view through a film support, screen and sensitive body, illustrating the way in which the improvements may be utilized in the taking of separate color sensation records or any single picture.

There is another function and advantage in the employment of a screen of this nature and that is that it tends to prevent halation during the exposure of an overlying sensitive body. Thus, it has utility when employed as shown in Fig. 4 as a sub-layer 2ᵃ on a single coated base 1ᵃ, 4ᵃ being the sensitive film, and it can be utilized in the process of my said prior patent where the color sensation negatives are separately taken and converted into dye positives and assembled with each other in register as a final operation. In other words, the sub-layer 2ˣ of Fig. 3 is beneficial in its results with respect to the film 4 as well as with respect to the film 3.

In its broadest aspects, the invention is therefore applicable to and advantageous in the taking of pictures on either single or double film and is useful with respect to double film whether or not the double or superposed images are color sensation records or prepared for future treatment of a different nature and to other ends although, as pointed out, when used in combination with the process of my former patent, additional advantages peculiar to the procedure in that process, in its relationship to the present improvement, ensue.

I claim as my invention:

1. A method of making photographs which comprises preparing a double gelatin film the two sensitive layers of which are separated by a gelatin screen that owes its light resisting properties to the presence therein of free silver; producing two photographic records by independent exposure on the respective sensitive layers while each is protected by the said screen from the light that exposes the other developing the layers, and treating the silvered portions of the latter and the screen with a bleaching bath and thereby bleaching the intermediate screen.

2. A method of making photographs in color which comprises preparing a double gelatin film the two sensitive layers of which are separated by a gelatin screen that owes its light resisting properties to the presence therein of free silver; producing two different photographic color sensation records by independent exposure in register with each other on the respective sensitive layers while each is protected by the said screen from the light that exposes the other developing the layers; hardening the silvered portions of the latter and the screen by means of a bleaching bath, and dyeing the softer portions of the exposed layers complementary colors with a dye that will be resisted by the hardened portions and by the hardened screen.

3. A method of making photographs in color which comprises preparing a transparent film base with an adhering layer of gelatin film containing light sensitive silver salts; exposing the said film to light and developing it to free the silver and produce an opaque screen; coating the base and the screen each with a sensitive gelatin film; producing two different photographic color sensation records by independent exposure in register with each other on the respective sensitive layers while each is protected by the said screen from the light that exposes the other, developing the layers; hardening the silvered portions of the latter and the screen by means of a bleaching bath, and dyeing the softer portions of the exposed layers complementary colors with a dye that will be resisted by the hardened portions and by the hardened screen.

4. A method of making photographs which comprises preparing a sensitive gelatin film with a backing screen of gelatin having light resisting properties due to the presence of free silver therein; producing a photographic record on said sensitive film by exposure to light, and subsequent development and rendering transparent the silvered portions of the exposed film and the screen by means of a bleaching bath.

5. A method of making photographs in color which comprises preparing a sensitive gelatin film with a backing screen of gelatin having light resisting properties due to the presence of free silver therein; producing a color sensation record on said sensitive film by exposure to light and subsequent development; hardening the silvered portions of the exposed film and the screen by means of a bleaching bath; dyeing the softer portions of the exposed film a given color with a dye that will be resisted by the hardened portions and by the hardened backing screen, and registering with the component thus produced another color sensation record of a complementary color.

6. A method of making photographs in color which comprises preparing a transparent film base with an adhering layer of gelatin film containing light sensitive silver salts; exposing the said film to light and developing it to free the silver and produce an opaque screen; coating the screen with a sensitive gelatin film; producing a color sensation record on said sensitive film by exposure to light and subsequent development; hardening the silvered portions of the record film and the screen by means of a bleaching bath; dyeing the softer portions of the exposed film a given color with a dye that will be resisted by the hardened portions and by the hardened screen, and registering with the component thus produced another color sensation record of a complementary color.

7. As an article of manufacture for use in producing photographs, a sensitive film secured to an underlying backing screen containing comminute free silver.

8. As an article of manufacture for use in producing color photographs, a sensitive gelatin film secured to an underlying backing screen of free silver carried in gelatin.

9. As an article of manufacture for use in producing photographs, a transparent film support, a layer thereon containing sufficient free silver to render it light resisting and a sensitive film overlying said layer.

10. As an article of manufacture, a transparent film support, a layer thereon containing sufficient free silver to render it light resisting, a sensitive film adhering to said layer and a sensitive film adhering to the opposite face of the support.

11. As an article of manufacture for use in producing color photographs, a transparent film support, a layer of gelatin thereon containing sufficient free silver to render it light resisting, a sensitive gelatin film adhering to said layer and a sensitive gelatin film adhering to the opposite face of the support.

12. As an article of manufacture for use in producing photographs, a double sensitive film, the separate layers of which are separated by an intervening screen containing free silver in sufficient quantity to render it light resisting.

13. As an article of manufacture for use in reducing color photographs, a double sensitive gelatin film, the separate layers of which are separated by an intervening screen of gelatin containing free silver in sufficient quantity to render it light resisting.

JOHN G. CAPSTAFF.

Witness:
RUSSELL B. GRIFFITH.